Patented Feb. 20, 1934

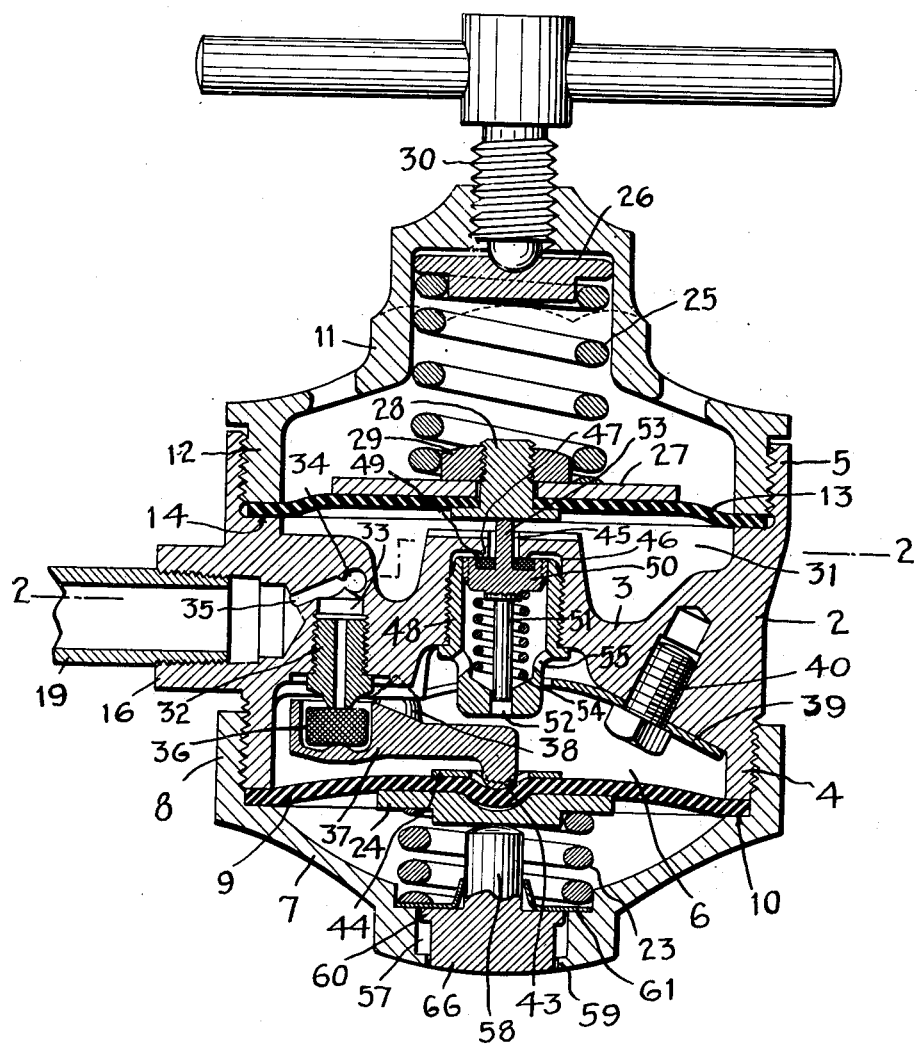

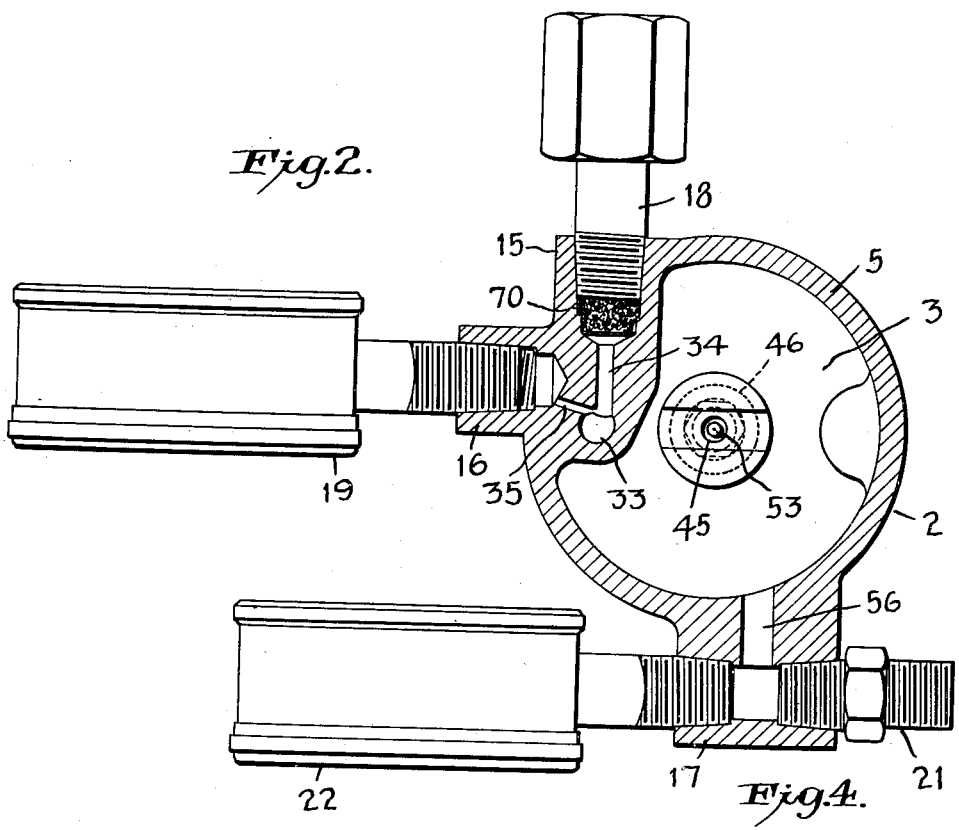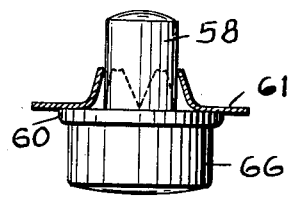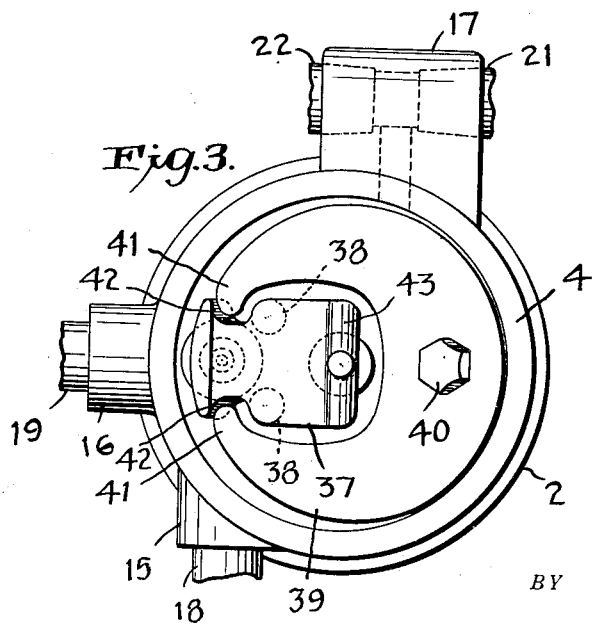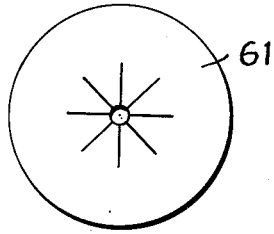

1,948,027

UNITED STATES PATENT OFFICE 1,948,027

COMPOUND GAS PRESSURE REGULATOR

George M. Deming, East Orange, N. J., assignor to Air Reduction Company, Incorporated, New York, N. Y., a corporation of New York Application June 30, 1931. Serial No. 547,851

6 Claims. (Cl. 50—23)

This invention relates to apparatus for regulating the pressure of a gas, for example oxygen as used with welding and cutting equipment. The invention relates more particularly to regulators in which the pressure is reduced in two successive stages in one unit of apparatus.

One object of the invention is to secure a high degree of compactness by a special construction and combination of parts forming a unit of this character. Another object is to provide a construction which is economical to manufacture. Other objects are facility of access to working parts, and this without the breaking of high pressure joints or the consequent necessity of sealing up metal to metal joints.

From the standpoint of operation, the objects are very precise and uniform regulation up to the end point, very low end point and saving of cylinder gas resulting from the lowering of the end point. Another object is the avoidance of humming.

These and other objects and features of the invention will be understood from the drawings, showing the preferred embodiment of the invention, and from the body of the specification.

In the said drawings:

Fig. 1 is an axial section through a pressure regulator embodying the invention;

Fig. 2 is a cross-section taken approximately on the irregular line 2—2 indicated in Fig. 1;

Fig. 3 is a plan view looking at the interstage side of the regulator, with the back cap and diaphragm removed;

Fig. 4 is a view, partly in section and partly in elevation, showing a signal button and a form of means for holding it in the position shown in Fig. 1; and Fig. 5 is a plan view of the holding washer illustrated in Fig. 4, before the prongs have been opened.

The body 2 of the regulator is generally circular. It has what may be termed an internal web wall 3, forming a division between the two stages of the compound regulator, and two annular rims 4 and 5 at its opposite ends. The rim 4 surrounds the inter-stage cavity 6, which is the reduced-pressure chamber of the first stage of the regulator. This rim has a screw-thread on the outside, whereas the rim 5 is screw-threaded on the inside. A back-cap 7 has a peripheral flange 8 which screws on the outside of the rim 4, and the margin of the first-stage diaphragm 9 is clamped between the end of said rim and an internal shoulder 10 of the cap. Another cap or bonnet 11 has a flange 12 which screws inside the rim 5 and clamps the second-stage diaphragm 13 against an internal shoulder 14 at the base of said rim. This construction of the body and its back cap and bonnet, in accordance with which the back cap screws on the outside of the body whereas the bonnet screws on the inside, aids in obtaining a short length for the compound unit while still leaving ample space on the mid-portion of the body on which to form the connection bosses 15, 16 and 17.

The diaphragms are preferably of fabric-reinforced rubber.

The boss 15 receives the high-pressure inlet connection 18, the boss 16 receives the high-pressure gauge 19, and the boss 17 receives the low-pressure outlet connection 21 and the low-pressure gauge 22.

The back cap contains a helical inter-stage control spring 23 of fixed tension, which bears at its opposite ends against the center of the cap and against a back plate 24 of the first-stage diaphragm. This spring determines a fixed and relatively high intermediate pressure in the interstage cavity 6.

The bonnet 11 contains an adjustable regulating spring 25, which bears at its outer end against a button 26 and at its inner end against a low-pressure diaphragm plate 27, the latter being fixed to this diaphragm by a headed stud 28 and a nut 29. A manual adjusting screw 30 has threaded engagement with the end of the bonnet and bears against the spring button 26 to adjust the delivery pressure of the gas which passes from the outlet 21.

Beneath the second stage diaphragm, and between it and the web wall 3, is the low-pressure cavity 31.

A high-pressure nozzle 32 is screwed from the inter-stage cavity 6 into a socket 33 of the web wall, adjacent one side of the regulator. The socket 33 is connected by a passage 34 with the socket of the inlet connection boss 18, and another passage 35 connects the passage 34 with the socket of the high-pressure gauge boss 16.

The lip of the nozzle 32 projects into the inter-stage cavity 6, where it coacts with a face of a valve element 36 of the kind known as a seat. This seat, which is preferably of comparatively hard material, is held in a recess in the short arm of a lever 37 of the first order and is pressed by simple leverage against the nozzle lip. This lever is fulcrumed on rounded protuberances 38, which work in conical recesses in the bottom of the cavity, as disclosed in my application Serial No. 243,062, filed December 28, 1927, which matured into Patent 1,839,837, Jan. 5, 1932, the friction of this fulcrum serving to suppress humming. A plate compensating spring 39 of more or less crescent form is secured to the bottom of the inter-stage cavity by a screw 40, and its tips 41 press against ears 42 projecting from the sides of the seat-holding portion of the lever, also as disclosed in the said application. The end of the long arm of the lever has a rounded crest 43 bearing against a central face plate 44 associated with the diaphragm 9. The lever is not fastened to the diaphragm.

The first stage of the compound regulator corresponds to a regulator of the direct type, more specifically a lever-type regulator. The compensating spring 39 presses the seat 36 against the nozzle 32 in opposition to the high inlet pressure acting through the orifice of this nozzle. The non-adjustable inter-stage control spring 23, which corresponds to the regulating spring of a regulator or reducing valve of this class, acts through the diaphragm against the lever, and, being superior to the compensating spring, will cause the seat to separate from the nozzle whenever the pressure in the inter-stage cavity tends to fall below the value for which the control spring is set. Whenever, on the contrary, the inter-stage pressure tends to increase, the control spring is overcome and the compensating spring urges the seat toward the nozzle.

The orifice 45 of the second stage of the regulator opens through the center of the web wall 3 of the body at the bottom of an internally threaded socket 46 which extends in from the inter-stage cavity 6. A lip 47 projects rearwardly around said orifice, constituting a nozzle.

A thimble 48 is screwed hand-tight into the socket 46. These screw-threads do not have to be gas-tight, so that the provision of a readily removable thimble is permissible. This thimble guides a rectilinearly movable valve element of the second stage of the compound regulator. This valve element comprises a seat 49, preferably of soft rubber, the face of which coacts with the nozzle 47, and a seat-holder 50. The head of the seat-holder is to be understood as being of a polygonal or equivalent shape, which gives it a sliding bearing in the cylindrical inner wall of the thimble while permitting gas to pass around it. A stem 51 extending rearward from the head is also guided in a hole 52 in the rear end of the thimble. A post 53 projects forward from the head of the seat-holder, through a central opening in the seat 49, and through the orifice 45, to coact with the head of the stud 28 of the second-stage diaphragm 13. This valve element is not fastened to the diaphragm. A marginal spring 54 inside the thimble exerts expansive force between the head of the seat-holder and the rear end of the thimble to urge the seat against the nozzle. Openings 55 in the thimble admit gas from the inter-stage cavity 6.

A passage 56 permits gas to pass from the low-pressure cavity 31 to the interior of the boss 17, whence it goes to the distributing line.

As thus described and illustrated, the second stage of the compound regulator will be recognized as being similar to a regulator of the inverse type, in which the valve element closes with the higher pressure, instead of against the higher pressure as in regulators of the direct type.

The pressure of the adjustable regulating spring 25 acting through the diaphragm 13 against the thrust projection 53 of the seat-holder 50 moves the seat 49 away from the nozzle 47 against the pressure of the gas in the inter-stage cavity 6 and against the pressure of the marginal spring 54. When the gas passing through the orifice 45 into the low-pressure cavity 31 builds up the intended delivery pressure in this cavity, such pressure acting on the diaphragm overcomes the regulating spring 25 and permits the valve to close under the inter-stage pressure and/or the pressure of the marginal spring. When the delivery pressure tends to decrease, the spring 25 acting through the diaphragm again unseats the valve element, permitting more gas to pass into the low-pressure cavity.

Important advantages result from employing in the first stage of the regulator the features of the herein described direct-type regulator of the lever class, and further advantages are obtained by combining a first stage of this kind with a construction for the second stage of the general nature which has been described. One of the advantages is a substantial gain in compactness for the entire unit. It will be observed that it has been possible to accommodate the nozzle, seat and lever of the first stage, and the seat-holder and guide thimble of the second stage, within a quite narrow cross-sectional zone, at the same time allowing for ample cavities 6 and 31 between the irregularly formed web wall 3 and the diaphragms 9 and 13. In consequence, the distance between these diaphragms is very short.

Other advantages have to do with excellence of total regulation and lowering of the end point. In the first or high-pressure stage the displacements of the seat 36 toward and from the nozzle 32 are very small, whereas in the second or low-pressure stage the seat displacements are comparatively large. In consequence, spring stiffness in the first stage has little influence, whereas in the second stage it is an important factor.

In a regulator of the direct type the delivery pressure or reduced pressure tends to droop with decreasing cylinder or supply pressure, whereas in a regulator of the inverse type the delivery pressure tends to rise with decreasing supply pressure. When operating on relatively high pressure, so that seat displacement is small and spring stiffness is not of moment, the delivery pressure of a direct type regulator will droop materially less than the delivery pressure of an inverse type regulator will rise. Consequently, the direct-type first stage regulation of the present compound regulator gives as nearly uniform inter-stage pressure as can be obtained. Furthermore, since this stage operates on high pressure, sufficient dampening friction can be introduced, as by means of the fulcrum protuberances 38, to insure against humming, without impairing the regulation.

In the second stage, the relatively large amplitude of the movements of the seat-holder and diaphragm brings spring stiffness into play. Whereas in a direct type regulator spring stiffness will augment the tendency of the delivery pressure to fall off with dropping supply pressure, in an inverse type regulator it will work against the tendency of the delivery pressure of such a regulator to rise. Since the operation of the second stage of a compound regulator involves relatively large seat displacement and exercises the springs, the inverse type of regulation is the most advantageous for this stage, and in combination with direct type regulation in the first stage gives almost perfect total regulation. Another advantage of compound regulators embodying this combination is the marked lowering of the end point of total regulation.

Furthermore, whereas the action of the direct, lever-type, first stage can be sufficiently dampened to prevent humming without detriment to its performance, that would not be true of the same type of regulation if applied to the second stage. On the other hand, inverse regulation in the second stage is free of humming. Consequently, the combination of lever type regulation in the first stage and inverse type regulation in the second stage not only provides the best resultant regulation but also eliminates the humming nuisance.

In event of seat-leak in the first stage of the regulator, pressure would build up in the inter-stage space 6 and could not be relieved into the low pressure cavity 31, because the valve element of the second stage closes in the direction in which the pressure acts. The inter-stage cavity not being provided with a pressure gauge, the first-stage diaphragm 9 might therefore be ruptured unnecessarily. To avoid this, a simple signaling device is provided, which is displayed or brought into prominence by the action of the diaphragm 9 when the latter is flexed outward beyond the position which it occupies when the seat 36 is closed against the nozzle 32.

The form of this signal or indicator can be varied. It preferably consists of a button 66 occupying an opening 57 in the center of the back cap 7 and normally even with the outer surface. This button has an inwardly projecting stem 58 opposed to the back plate 24 of the diaphragm, but not ordinarily displaced by the latter. When the diaphragm is pushed out abnormally, the button is protruded. The signal thus given may be made more pronounced by coloring the sides of the button red, these sides being ordinarily concealed by the cap. An internal flange 59 on the cap at the outer end of the opening 57 and an external stop flange 60 on the inner end of the button keep the signal button from coming entirely out of the case. A washer 61 held between the spring 23 and the inside of the back cap, encircling the stem 58 and provided with a number of rearwardly bent, inclined prongs pressing resiliently against the sides of the stem, keeps the signal button reliably in place but permits the button to be pushed outward by the diaphragm. Other forms of non-positive holding means may be provided for this purpose. The signal holding means enables the button to be pushed in again to retained position if the seat obstruction should clear itself, making it unnecessary to take off the back cap to clean or replace the seat.

A signal device of this general character may be applied with equal advantage to a single-stage regulator or reducing valve not provided with a low pressure gauge.

The ease of inspection and removal of the working parts of the regulator will be apparent. Removal of one cover, namely the back-cap 7, exposes the lever, seat and nozzle of the first stage and the thimble containing the seat and seat-holder of the second stage. The back cap having been removed, the only operation required to remove the high-pressure seat 36 is to unscrew the screw 40, which permits the compensating spring 39, the lever 37 and the seat to be taken out. The low pressure seat 49 and its seat-holder can be extracted by merely unscrewing the thimble 48. No high pressure joint is opened in connection with these operations and no metal to metal joint has to be sealed when the parts are replaced and the back cap screwed on again.

The operation of the regulator is as follows: High pressure gas from the cylinder or other source enters at 15, and after passing through a filter 70, enters the nozzle 32. The high pressure seat 36 being held away from the nozzle by the inter-stage control spring 23, the gas flows through the nozzle and into the inter-stage cavity 6. There the pressure builds up until the force against the diaphragm overcomes the force of the control spring and the seat closes against the nozzle under the action of the compensating spring 39. If the adjusting screw 30 is now turned in, compressing the regulating spring 25, the gas after flowing through the ports 55 of the guide thimble 48 and past the seat holder 50, can discharge through the orifice 45 into the low pressure cavity 31, and thence out through outlet 21.

While the preferred embodiment of the invention has been described in detail, it will be understood that various changes are permissible within the general scope of the invention.

I claim:

1. A pressure regulator having a body formed with an internal wall and with an inter-stage cavity and a low-pressure cavity at opposite sides of said wall, first-stage and second-stage diaphragms covering said cavities, caps applied to opposite sides of said body, springs beneath said caps bearing on said diaphragms, an orifice nozzle in said internal wall projecting into said inter-stage cavity, a valve element having a face coacting with the terminal lip of said nozzle, a lever of the first order in said inter-stage cavity, said lever having a long arm and a short arm, said long arm bearing against the under side of the first-stage diaphragm, and said short arm acting by simple leverage on said valve element, a compensating spring acting on said lever to urge said valve element against said lip, said internal wall having an orifice through which gas passes from the inter-stage cavity to the low-pressure cavity, a projecting nozzle lip at the inlet end of said orifice, a valve element having a face coacting with said nozzle lip, a guide in said wall in which this latter valve element is truly guided, a thrust element extending through this orifice between this valve element and the second-stage diaphragm, and a spring urging this valve element against the inlet of this orifice.

2. A pressure regulator having a body formed with an internal wall and with an inter-stage cavity and a low-pressure cavity at opposite sides of said wall, first-stage and second-stage diaphragms covering said cavities, caps applied to opposite sides of said body, springs beneath said caps bearing on said diaphragms, means providing an orifice through which gas enters the inter-stage cavity, a valve coacting with the outlet of said orifice, a lever associated at one end with said valve element and bearing at the other end against the under side of the first-stage diaphragm, a compensating spring acting on said lever, said internal wall having an orifice through which gas passes from the inter-stage cavity to the low-pressure cavity, a valve element coacting with the inlet of this latter orifice, a guide in said wall in which this latter valve element is truly guided, a thrust element extending through this orifice between this valve element and the under side of the second-stage diaphragm, and a spring urging this valve element against the inlet of this orifice, said lever and both said valve elements being readily removable from the inter-stage cavity on removal of a single cap and the first-stage diaphragm.

3. A pressure regulator having a body formed with an internal wall and with an inter-stage cavity and a low-pressure cavity at opposite sides of said wall, first-stage and second-stage diaphragms covering said cavities, caps applied to opposite sides of said body, means providing an orifice through which gas enters the inter-stage cavity, a valve element coacting with the outlet of said orifice, a lever associated at one end with said valve element and bearing at the other end against the under side of the first-stage diaphragm, a compensating spring acting on said lever, said internal wall having an orifice through which gas passes from the inter-stage cavity to the low-pressure cavity, a valve element coacting with the inlet of this latter orifice, a formation on said wall against which this latter valve element seats, said wall having a socket, a thimble inserted in said socket from the inter-stage cavity and removable from said wall and from said formation on the wall, said valve element being guided in said thimble, and a spring in said thimble urging said valve element against said formation, said lever and its valve element, and said thimble and its valve element, being readily removable from the inter-stage cavity on removal of a single cap and the first-stage diaphragm.

4. A pressure regulator having a one-piece body formed with an internal wall, an inter-stage cavity and a low-pressure cavity at opposite sides of said wall, and oppositely projecting annular rims, inlet and outlet connections on a central zone of said body, a first-stage diaphragm seated on top of one of said rims, a cap screwed on the outside of this rim and clamping the margin of said diaphragm, a diaphragm seat formed below the top of the other rim, a second-stage diaphragm seated on this seat, a cap screwed on the inside of this rim and clamping the margin of the second-stage diaphragm, springs beneath said caps bearing on said diaphragms, an orifice nozzle set in said internal wall and projecting into said inter-stage cavity, said nozzle being in communication with said inlet connection, a valve element coacting with the terminal lip of said nozzle, a lever associated at one end with said valve element and bearing at the other end against said first-stage diaphragm, a compensating spring bearing against said lever, said internal wall having an orifice through which gas passes from the inter-stage cavity to the low-pressure cavity, a valve element coacting with the inlet end of this latter orifice, a guide in said wall in which the latter valve element is truly guided, a thrust element extending through this orifice between this valve element and the second-stage diaphragm, and a spring urging this valve element against the inlet of this orifice, said lever and both of said valve elements being removable from said inter-stage cavity on removing the back cap and the first-stage diaphragm.

5. A pressure regulator having a body formed with an internal wall and with an inter-stage cavity and a low-pressure cavity at opposite sides of said wall, first-stage and second-stage diaphragms covering said cavities, caps applied to opposite sides of said body, springs beneath said caps bearing on said diaphragms, an orifice nozzle in said internal wall projecting into said inter-stage cavity, a valve element having a face coacting with the terminal lip of said nozzle, a lever of the first order in said inter-stage cavity, said lever being fulcrumed on said internal wall and freely separable therefrom, one arm of said lever bearing against the under side of the first-stage diaphragm and the other arm acting by simple leverage on said valve element, a compensating spring acting on said lever to urge said valve element against said lip, said internal wall having an orifice through which gas passes from the inter-stage cavity to the low-pressure cavity, a projecting nozzle lip on said wall at the inlet end of said orifice, a one-piece thimble inserted in said wall from the inter-stage cavity side and removable from said wall and from said lip on the wall, a valve element truly guided in said thimble and having a face to coact with said lip, and a spring confined between this latter valve element and the integral rear end of said thimble to urge the valve element against said lip, said lever, said thimble and both valve elements being readily removable from the inter-stage cavity on removal of a single cap and the first-stage diaphragm.

6. A pressure regulator having a body formed with an internal wall and with an inter-stage cavity and a low-pressure cavity at opposite sides of said wall, first-stage and second-stage diaphragms covering said cavities, caps applied to opposite sides of said body, springs beneath said caps bearing on said diaphragms, an orifice nozzle in said internal wall projecting into said inter-stage cavity, a valve element having a face coacting with the terminal lip of said nozzle, a lever of the first order in said inter-stage cavity, said lever having a long arm and a short arm, said long arm bearing against the under side of the first-stage diaphragm, and said short arm acting by simple leverage on said valve element, a compensating spring acting on said lever to urge said valve element against said lip, said internal wall having an orifice through which gas passes from the inter-stage cavity to the low-pressure cavity, a valve element coacting with the inlet end of said orifice, a guide in said wall in which this latter valve element is truly guided, a thrust element extending through this orifice between this valve element and the second-stage diaphragm, and a spring urging this valve element against the inlet of this orifice.

GEORGE M. DEMING.